B. E. RICHARDSON.
TRANSMISSION MECHANISM.
APPLICATION FILED FEB. 24, 1920.

1,413,058.

Patented Apr. 18, 1922.

Inventor

Bayard E. Richardson

By Frank E. Liurance, Jr.
Attorney

UNITED STATES PATENT OFFICE.

BAYARD E. RICHARDSON, OF GRAND RAPIDS, MICHIGAN, ASSIGNOR TO MECHANO GEAR SHIFT COMPANY, OF GRAND RAPIDS, MICHIGAN, A CORPORATION OF MICHIGAN.

TRANSMISSION MECHANISM.

1,413,058.  Specification of Letters Patent.  Patented Apr. 18, 1922.

Application filed February 24, 1920. Serial No. 360,928.

*To all whom it may concern:*

Be it known that I, BAYARD E. RICHARDSON, a citizen of the United States of America, residing at Grand Rapids, in the county of Kent and State of Michigan, have invented certain new and useful Improvements in Transmission Mechanisms; and I do hereby declare the following to be a full, clear, and exact description of the invention, such as will enable others skilled in the art to which it appertains to make and use the same.

This invention relates to a motor vehicle transmission mechanism.

It is desirable in transmission mechanisms of the sliding gear type, during the time a change is made from one speed to another that the mechanism shall be disconnected from the engine and this is effected in all makes by operation of a clutch pedal which disconnects a clutch interposed between the engine and the transmission mechanism. It is also desirable that said transmission mechanism be disconnected from the drive shaft of the automobile which drives the rear axle thereof, as the momentum of the vehicle under motion at the time that a shift of gears is made, serves to drive the transmission from the rear. Practically all makes of motor vehicles make no provision for this disconnection of the transmission from the rear axle. I have heretofore made a construction for accomplishing this disconnection of the transmission from the drive shaft of the automobile and it is the subject matter of an application for patent by me, Serial No. 262,384, filed Nov. 13, 1918. The construction, however, in said application, while thoroughly practical and operative, requires a change in the design of the transmission casing and also in the drive shaft as to length and the universal joint connection of the main shaft of the transmission with said drive shaft so far as its position is concerned.

In the present invention a novel construction of transmission is provided in which the desirable results disclosed in my former application above noted are fully attained by a mechanism which is built in the transmission and mounted on the jack shaft thereof, thereby obviating any marked changes in design of present constructions of transmissions and requiring changes only in parts of said transmissions, this reducing the cost of manufacture, simplifying the construction and obviating the necessity of long experimentations for a proper co-relation of weights, dimensions and sizes which are necessitated in motor vehicle designs when changes in design are made. The present construction of transmission may be applied directly in place of the transmissions which are now used in motor vehicles using the same transmission casing, sliding gears and main shaft, the only difference being a mounting of a different construction on the jack shaft of the transmission which may be readily applied thereto.

For an understanding of the invention and the construction embodying the same, reference may be had to the following description taken in connection with the accompanying drawing, in which.

Like reference characters refer to like parts in the different views of the drawings.

Figure 1:
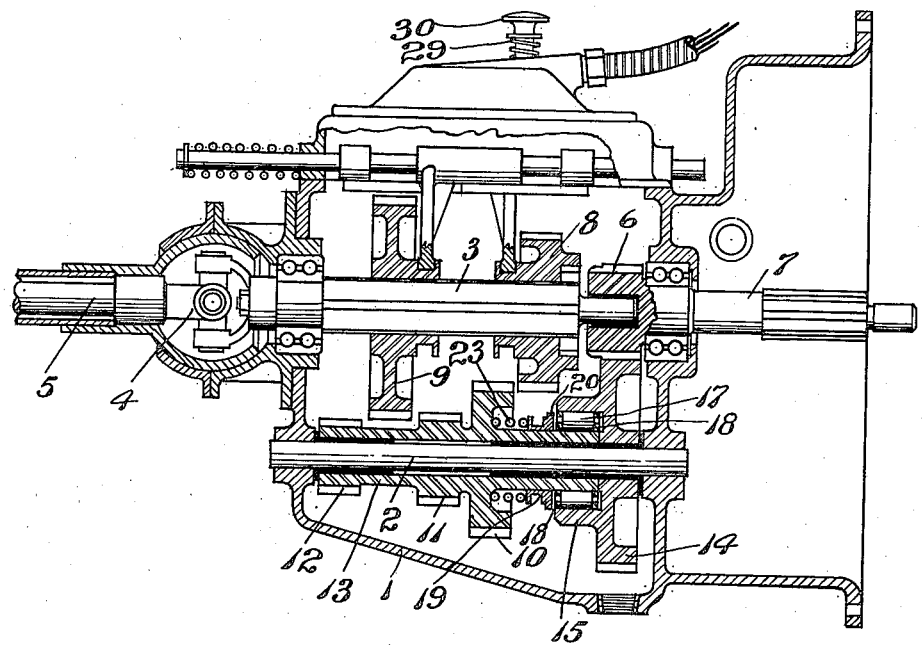
Fig. 1 is a vertical longitudinal section taken through a transmission mechanism equipped with my invention.

The transmission case 1 is of any well-known type of design having a lower jack shaft 2 rotatably mounted lengthwise thereof and an upper main transmission shaft 3 rotatably mounted, the rear end thereof having a universal joint connection as indicated at 4 with the drive shaft 5 of the vehicle on which the transmission is installed. The front end of the main shaft 3 is loosely mounted in a suitable recess made in the rear of a gear 6 formed at the rear end of a short shaft 7 which, in practice, is in alinement with the crank shaft of the engine and is connected thereto by the usual clutch (not shown). The main transmission shaft 3 has sliding gears 8 and 9 splined thereon while on the jack shaft gears 10, 11 and 12 are formed integral with a sleeve 13 loosely mounted on the jack shaft and located between the rear end of the casing 1 and a gear 14 which is loosely mounted on the jack shaft at the front end of the transmission casing. The gear 14 is in mesh with the gear 6. The sliding gear 8 is adapted to connect with the gear 6 when moved in a forward direction and with the gear 10 when moved to the rear. Similarly the sliding gear 9 when moved in a forward direction meshes with the gear 11 and when moved to the rear with a suitable pinion which is interposed between it and the gear 12 thereby giving what is known as the reverse speed to the transmission.

Figures 2, 3, 4:
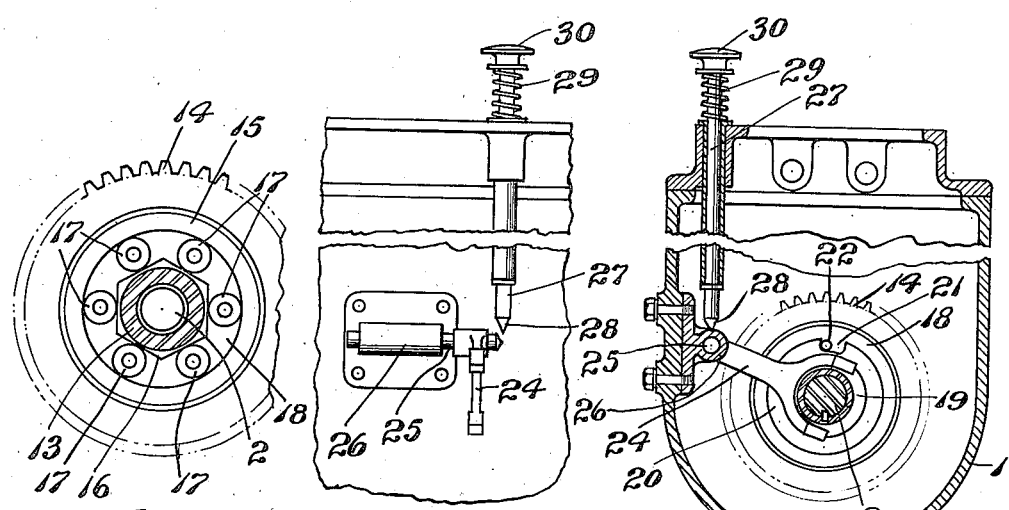
Fig. 2 is a vertical transverse section through the transmission with parts broken away for clearness of disclosure.
Fig. 3 is a fragmentary elevation looking against one of the inner sides of the transmission case.
Fig. 4 is an enlarged transverse section taken immediately behind the over-running clutch which forms one part of and is associated with one of the gears of the transmission.

The front end of the sleeve 13 extends within an annular collar 15 cast integral with and projecting to the rear from gear 14. Sleeve 13 at its front end is formed into hexagonal shape, as indicated at 16, and between each of the sides of the hexagon and the inner cylindrical surface of the collar 15 a roller 17 is positioned. The rollers 17 are carried between two rings 18 which are placed around sleeve 13, one at each end of the hexagonal section 16 thereof, being loosely mounted and free of any connection to either the sleeve 13 or the collar 15 except as made by the rollers 17. A collar 19 may be splined on the sleeve 13 directly back of the rear plate 18 and the same has a front flange 20 provided with a recess 21, as shown in Fig. 2, into which a pin 22 attached to the rear plate 18 extends. This collar is normally pressed toward the front by a coiled spring 23 interposed between it and gear 10 as shown in Fig. 1.

In operation when the shaft 7 is driven to move the vehicle in a forward direction the clutch mechanism mounted on the jack shaft and consisting of the hexagonal part 16, rollers 17, rings 18 and collar 15 serves to drive the sleeve 13 positively at all times due to the fact that the rollers 17 are wedged between the sides of the hexagonal section 16 and the inner side of the collar 15 so that for either shifting to first or second speeds a positive and direct connection is made between the engine shaft and the drive shaft of the vehicle; while for third speed there is a direct connection from the engine shaft to the main transmission shaft 3 as is obvious. During the time that a change is made between any of the speeds, first, second and third forward and when the engine is disconnected from the transmission in the usual manner by operating the clutch pedal, should the momentum of the vehicle drive the transmission, the effect is only to drive the sleeve 13 whereupon the rollers 17 move freely around within the collar 15. This follows by reason of the fact that the pin 22 when moved to the opposite side of the notch 21 positions rollers 17 midway between the corners of the hexagonal members 16 allowing a free rolling movement of the rollers within collar 15.

Shifting of gears between first, second and third speeds is, accordingly, more easily accomplished with no clashing of gearing such as many times occurs where the shaft 7 with its attached part of the drive clutch, its gear 6 and heavier gear 14 are also driven from the rear by the momentum of the vehicle. This is particularly desirable in transmissions which are changed through the power of the clutch spring, the power for shifting the gears coming from the clutch spring as outlined in the second of my prior applications for patent.

In order to have the engine act at times as a brake on the momentum of the vehicle, it is necessary that the over-running clutch described may be rendered inoperative. This is done by moving the collar 19 to the rear so as to disconnect the same from the pin 22 thereby leaving the rollers 17 free to wedge between the sides of the hexagon 16 and the inner cylindrical side of the collar 15, irrespective of the direction of the rotative movement. The movement of the collar 19 to the rear is accomplished by use of the following mechanism: A bar 24 formed at one end with a fork to engage with the collar 19 is connected at its opposite end to a rod 25 slidably mounted in a sleeve 26 formed integral with a bracket which is attached to the inner side of the transmission casing 1, as shown in Figs. 2 and 3. A vertical push rod 27 extends downwardly through the transmission casing being formed with a lower conical end 28. Normally the rod is held in an upper position by a spring 29 which is interposed between the upper side of the transmission case and a head 30 attached to the upper end of the push rod. By forcing the rod downwardly spring 29 is compressed and the lower conical end 28 of the push rod brought against a similar end of the rod 25, moving the same lengthwise and simultaneously moving the collar 19 to the rear sufficient to disengage it from the pin 22. The over-running clutch thereupon becomes ineffective and the vehicle may be driven in a reverse direction. This is also very desirable and necessary when the vehicle is going down steep hills and the speed thereof is to be checked by a connection of the rear axle of the vehicle through the transmission to the engine. It is usual to shift to the first or low speed when going down a long and steep grade whereupon the weight and momentum of the vehicle itself drives the engine and serves to put an effective brake against too rapid speed.

From the foregoing it will be clear that I have provided an effective and practical construction of transmission serving all of the purposes of the construction shown in my former application for patent first above noted and with a simplification of design and application of the invention to existing designs of transmissions. The invention is defined in the appended claims and I consider myself entitled to all modifications of structure which fall within the scope thereof.

I claim:

1. A transmission including a main transmission shaft, a driving shaft in alinement with and normally loosely connected to the main transmission shaft, gears splined on the main transmission shaft, a jack shaft, a sleeve mounted on the jack shaft, a plurality of gears connected to said sleeve and with which the gears on the main transmission shaft may be engaged on sliding movement thereof, a gear mounted on the jack shaft in front of said sleeve, means to drive said gear continuously from the said drive shaft, a clutch disposed between said gear and the front end of the sleeve, said clutch operating to connect the gear and sleeve on driving movement of the gear in one direction, and including means which renders said drive movement inoperative when the gear is driven in the opposite direction, and means for rendering said clutch effective to drive the sleeve irrespective of its direction of movement of the gear, substantially as described.

2. In combination in a sliding gear transmission, a jack shaft, a relatively large gear loosely mounted adjacent the front end of the jack shaft, a sleeve mounted on the jack shaft back of said gear and carrying a plurality of gears, a clutch disposed between said first gear and the front end of the sleeve, said clutch operating to connect the gear and sleeve on turning movement of the gear in either direction, and means mounted on the sleeve and engaging with the clutch for rendering the same inoperative to connect the gear and sleeve on turning movement of said gear in one direction or turning movement of the sleeve in the opposite direction, substantially as described.

3. In a sliding gear transmission, a jack shaft, a gear mounted on the jack shaft adjacent the front end thereof, a sleeve mounted on the jack shaft back of the gear, said sleeve carrying a plurality of gears, a clutch disposed between the first gear and front end of the sleeve, including means adapted to connect the gear and sleeve together on rotative movement of the gear in either direction, and means movably mounted on the sleeve and engaging with the clutch normally tending to render the clutch inoperative on movement of the first gear in one direction, said means when moved away from the clutch rendering the clutch operative to connect the gear and sleeve irrespective of the direction of movement of either the gear or sleeve, substantially as described.

4. In combination a casing, a sliding gear transmission including a jack shaft below the main shaft of the transmission mounted in the casing, a gear rotatably mounted on the jack shaft adjacent its front end, a sleeve mounted on the jack shaft back of the gear, said gear including a collar extending from its rear side over the front end of the sleeve and said sleeve being formed at its front end with sides positioned at an angle to each other, a ring located around the sleeve at each end of said front end portion of the sleeve, the rearmost of said rings having a pin extending rearwardly therefrom, a plurality of rollers located between the rings, one between each side of the front end of the sleeve and the inner side of said collar, a second collar mounted on the sleeve and provided with a notch into which said pin extends, spring means tending to move said second collar in a forward direction, and means operable from without the casing for moving said second collar to the rear against the force of said spring, substantially as described.

5. A transmission including a jack shaft, a gear mounted on the same adjacent its front end, a sleeve mounted on the jack shaft back of the gear and carrying a plurality of gears thereon, said first mentioned gear having a collar extending rearwardly from its rear side over the front end of the sleeve and said sleeve being formed within said collar with a plurality of sides positioned at angles to each other, spaced apart rings around the sleeve within said collar, rollers located one between each side of the front end of the sleeve and the inner side of the collar, a second collar mounted on the sleeve back of the first collar, a spring tending to force said second collar in a forward direction, means disposed between said second collar and the rearmost ring for normally holding the rollers so that a driving connection may be made between the gear and sleeve in one direction of movement of the gear but rendering connection between the same on opposite direction of the movement of the gear ineffective, a push rod operable from without the transmission, and means interposed between said push rod and said second collar for moving said collar to the rear on operation of the push rod, substantially as described.

6. In combination, a transmission including a transmission casing, a jack shaft disposed between the ends of the casing, a gear mounted on the same at the front end thereof, a sleeve mounted on the jack shaft back of the collar, clutch mechanism disposed between the gear and sleeve for driving the sleeve from the gear in either direction of movement thereof, means movably mounted on the sleeve and normally associated with the clutch mechanism to render said driving connection ineffective with one direction of movement of the gear or the opposite direction of the movement of the sleeve, means yieldingly holding said first means in forward operative position, and means operable from without the casing for moving said first means away from the clutch to permit positive connection of the sleeve and gear, irrespective of their direction of movement, substantially as described.

7. In combination, driving and driven shafts, a sliding gear transmission disposed between the same and adapted to connect said driving and driven shafts to give a plurality of forward and reverse speeds of the driven shaft with respect to the driving shaft, means within the transmission for positively driving the driven shaft from the drive shaft but rendering ineffective the driving of the driving shaft by the driven shaft on the same direction of movement, and means for rendering said last mentioned means inoperative and ineffective to thereby positively connect the drive and driven shafts irrespective of their direction of movement, substantially as described.

In testimony whereof I affix my signature.

BAYARD E. RICHARDSON.